June 5, 1956 L. V. DAUGHERTY 2,748,626
SAW TOOTH WRENCH
Filed June 8, 1955
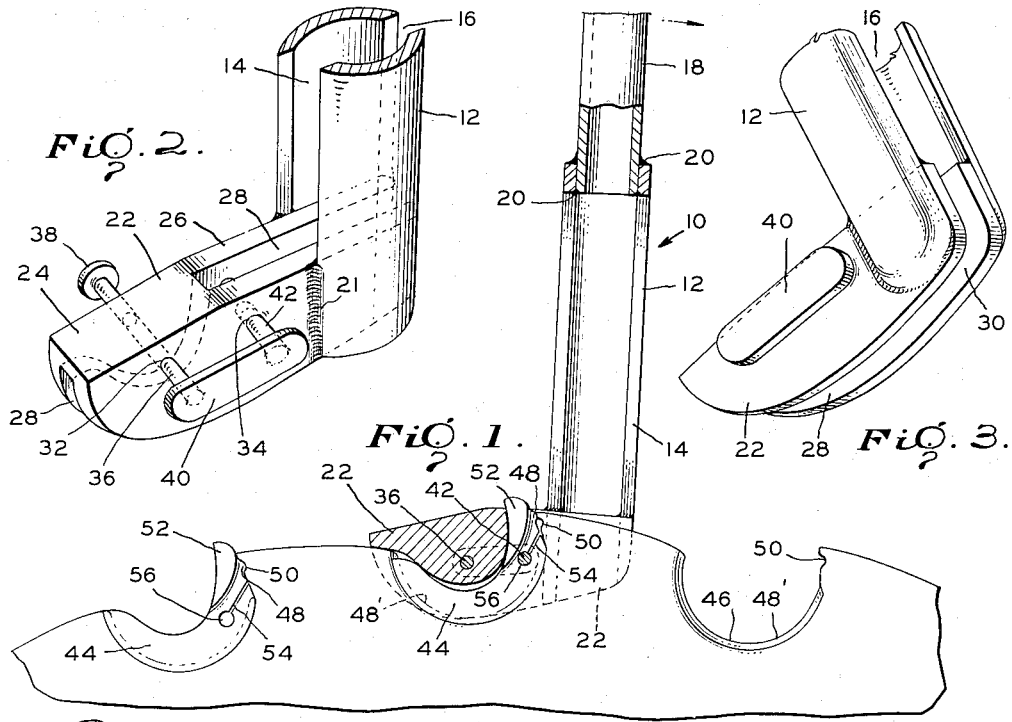
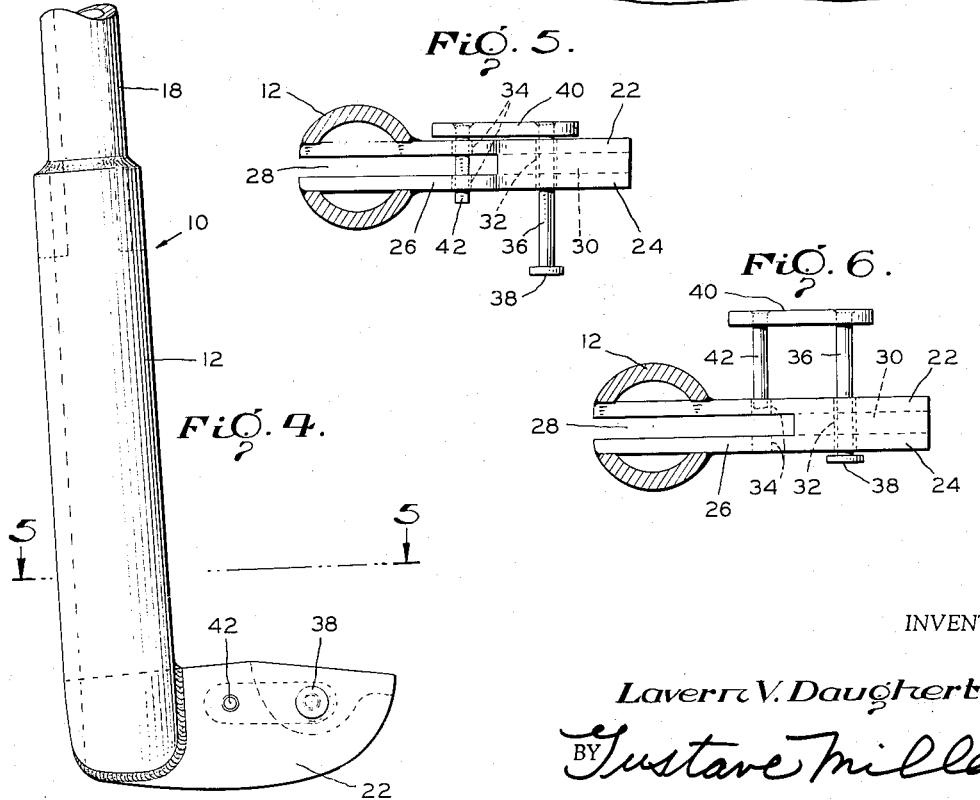
INVENTOR
Lavern V. Daugherty.
BY Gustave Miller
ATTORNEY

United States Patent Office 2,748,626
Patented June 5, 1956

2,748,626

SAW TOOTH WRENCH

Lavern V. Daugherty, Orofino, Idaho

Application June 8, 1955, Serial No. 513,937

5 Claims. (Cl. 76—80)

This invention relates to a wrench, and it particularly relates to a wrench adapted to set removable teeth in the sockets of a saw tooth blade.

The use of saw blades having replaceable teeth is common in many industries, and particularly in lumber mills where the teeth of the saws take such hard wear that frequent replacement is necessary. If it were necessary to replace the entire saw blade each time, the cost would soon become prohibitive. There have, therefore, been devised saw blades which have replaceable teeth. Since the cost of replacing an individual tooth is far less than the cost of replacing an entire blade, these types of saws have come into extensive use. However, it is generally rather difficult to remove and insert such small teeth into their individual sockets in the saw tooth blade in such a manner that they are firmly enough engaged in the sockets to withstand the heavy pressures and frictions encountered during use. It is, therefore, necessary to provide special tools for this purpose. However, the tools heretofore used for this purpose have not been adequate for the purpose since they have not been capable of inserting the teeth with a sufficiently tight fit, nor have they been capable of extracting the teeth with a simple and easy action.

It is therefore, one object of the present invention to provide a wrench adapted to easily and quickly insert or extract removable teeth from the sockets of a saw blade.

Another object of the present invention is to provide a wrench for inserting and extracting removable teeth from a saw blade which can be efficiently used without the exercise of any unusual amount of skill.

Another object of the present invention is to provide a wrench for inserting and extracting removable teeth from a saw blade which is simple in construction and which consists of relatively few parts.

Other objects of the present invention are to provide an improved wrench, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawing in which:

Fig. 1 is a fragmentary sectional view of a wrench embodying the invention, the wrench being shown in position to insert a tooth in a socket.

Fig. 2 is a fragmentary top perspective view of the lower portion of the wrench.

Fig. 3 is a fragmentary bottom perspective view of the lower portion of the wrench.

Fig. 4 is a fragmentary side elevational view of the wrench.

Fig. 5 is a top plan view of the bottom end of the wrench, showing the handle in cross-section.

Fig. 6 is a top plan view similar to Fig. 5, showing the locking mechanism in released position.

Referring now in greater detail to the drawing wherein similar reference characters refer to similar parts, there is shown a wrench, generally designated 10, which comprises a split, tubular shank 12 on opposite sides of which are formed longitudinal slots, as at 14 and 16. A tubular handle 18, of somewhat smaller diameter than the shank 16, is secured to the top portion of the shank, as by welding 20 or the like.

At the bottom of the shank 12 extending within the front and rear slots 14 and 16, and fixed thereto as by welding 21 or the like, is the head 22 of the wrench. This head 22 comprises a solid tip portion 24 and a slotted rear portion 26, the slot in the rear portion being designated 28. The tip portion 24 is itself provided with a groove 30 on the underside thereof; this groove 30 being longitudinally aligned with the slot 28, as best shown in Figs. 5 and 6. A pair of laterally spaced holes 32 and 34 are provided in the head 22, both of these holes extending completely through the head from one side to the other. The hole 32 extends through the upper, solid portion of the tip 24 whereas the hole 34 intersects the slot 28. Slidably positioned in the hole 32 is a pin 36 having a head 38 at one end and connected to one end of a plate 40 at its other end. The opposite end of the plate 40 is provided with a pin 42 extending in the same direction as the pin 36, but substantially shorter than the pin 36. This pin 42 is adapted to slide into and out of the hole 34 upon movement of the plate 40 laterally of the head.

The wrench 10 is adapted to insert a semi-circular tooth 44 into each of the sockets 46 in the saw blade. Each tooth 44 is provided with a concave upper edge and a convex bottom edge. A shoulder 48 is formed on the upper rear edge of the tooth and is adapted to engage within a complementary groove 50 in the socket. The cutting edge of the tooth is provided at the upper rear edge at 52. A slot 54 extends from the rear edge of the tooth, just below the shoulder 48 to a hole 56 in the tooth. This slot is provided for the purpose of adding a certain amount of flexibility to the tooth under the stress of the cutting operation. A groove, not shown, is provided on the bottom convex edge of the tooth, this groove being adapted to frictionally engage over a complementary beveled edge 48 in the socket.

In order to insert the tooth 44 is the socket, the plate 40 on the wrench head 22 is pulled back until the pin 42 is entirely removed from the hole 34. The tooth is then inserted, concave side up, as far as it will go, into the bottom groove and slot of the wrench head 22. The plate 40 is then pushed in so that the pin 42 in inserted through the hole 34 in the head and through the aligned hole 56 in the tooth; the pin 36 acting as a guide. The wrench head, with the tooth 44 held therein, is then applied to the socket in such manner that the tooth is inserted into the socket with the bottom groove thereon over the beveled edge 48 of the socket. The handle is then manipulated to rock the head 22 until the shoulder 48 of the tooth is forced firmly into the groove 50 in the socket and the tooth is firmly wedged in place in the socket. Thereafter, the plate 40 is pulled out so that the pin 42 is removed from the hole 56 in the tooth, after which the wrench is easily removed. When a tooth is to be removed, the wrench is again applied to the socket, the plate 40 is pushed in so that the pin 42 engages in the hole 56 of the tooth, and the wrench is manipulated to move the shoulder 48 out of the groove 50. The tooth is then released by rocking the wrench until the tooth comes away with it.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A wrench for inserting and removing semi-circular teeth in saws which comprises a handle having a head at one end thereof, said head being provided with a channel on the underside thereof, a lateral opening intersecting said channel, a pin movable into and out of said lateral opening, and means connecting said pin to said head both when it is inserted in said opening and when it is removed therefrom, said means comprising a guide pin laterally spaced from first pin and connected thereto by a spacing member, said guide pin being slidably positioned in a second opening in said head.

2. The wrench of claim 1 wherein said guide pin is provided with a stop means to prevent its withdrawal from said second opening.

3. A wrench for inserting and removing semi-circular teeth in saws which comprises a tubular shank, a handle at one end of said shank, a pair of oppositely arranged slots extending longitudinally of said shank, a head positioned between said slots at the end of said shank opposite said handle, said head extending laterally of said shank, a channel on the underside of said head, an opening intersecting said channel, a pin movable into and out of said opening, and guide means on said head for guiding said pin during its movement into and out of said opening.

4. The wrench of claim 3 wherein said guide means is constructed and arranged to connect said pin to said head during all positions of movement thereof.

5. A wrench head comprising a generally elongated body having a convexly curved underside, one portion of said body being substantially imperforate and another portion of said body having a longitudinal slot therethrough, a groove on the underside of said first portion, said groove being aligned with said slot to form a continuous channel on the underside of said head, an opening extending laterally through said head and intersecting said slot, a second opening extending laterally through said first portion of said head above said groove, a first pin movable into and out of said first opening, a second pin, substantially longer than said first pin, and slidably positioned in said second opening, a stop means at one end of said second pin, and a connecting bar connecting the opposite end of said second pin to the corresponding end of said first pin.

References Cited in the file of this patent

UNITED STATES PATENTS

| | | |
|---|---|---|
| 892,228 | Damon | June 30, 1908 |
| 1,672,458 | Horner | June 5, 1928 |
| 2,669,886 | Haughy | Feb. 23, 1954 |